J. K. DIAMOND.
BELT HOOK OR STAPLE.
APPLICATION FILED MAR. 4, 1916.

1,227,253.

Patented May 22, 1917.

Inventor
James K. Diamond
By Moulton & Livrance.
Attorneys.

UNITED STATES PATENT OFFICE.

JAMES K. DIAMOND, OF GRAND RAPIDS, MICHIGAN, ASSIGNOR TO CLIPPER BELT LACER COMPANY, OF GRAND RAPIDS, MICHIGAN, A CORPORATION OF MICHIGAN.

BELT HOOK OR STAPLE.

1,227,253.                Specification of Letters Patent.        Patented May 22, 1917.

Application filed March 4, 1916. Serial No. 82,221.

*To all whom it may concern:*

Be it known that I, JAMES K. DIAMOND, a citizen of the United States of America, residing at Grand Rapids, in the county of Kent and State of Michigan, have invented certain new and useful Improvements in Belt Hooks or Staples; and I do hereby declare the following to be a full, clear, and exact description of the invention, such as will enable others skilled in the art to which it appertains to make and use the same.

This invention relates to improvements in belt hooks of the double pointed type, it being a primary object and purpose of the present invention to provide a hook of this character which may be secured to the end of a belt and when thus secured will firmly resist detachment therefrom, the hook when once attached having parts engaging with the belt material in such manner that the removal of the belt hook can be obtained only by tearing or disrupting the belt material at points where the attaching prongs of the hook enter the belt. By reason of this structure a less number of hooks may be employed in securing the ends of belting together and there is much less liability of the hooks working out of the belt during its use. Various other objects and purposes other than the one specifically set forth together with novel constructions for attaining the same will appear as an understanding of the embodiment of the invention illustrated in the accompanying drawing is had, in which:

Like reference characters refer to like parts throughout the several views of the drawing.

Figure 1:
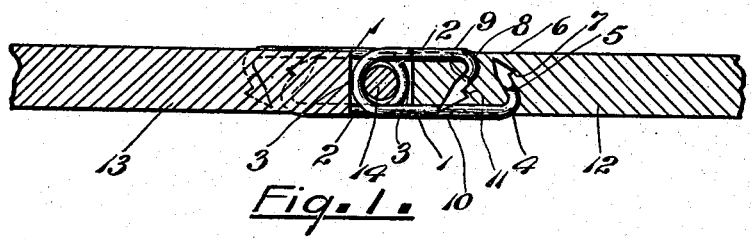
Figure 1 is a longitudinal sectional view illustrating the connection of two meeting ends of a belt by the use of my belt hooks.
Figure 2:
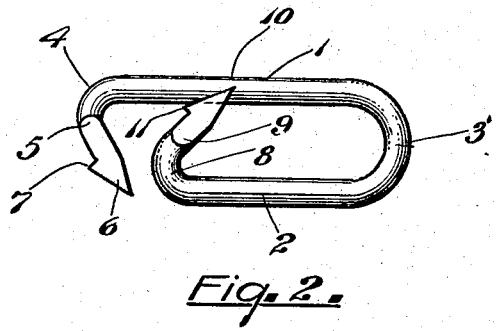
Fig. 2 is an enlarged side elevation of a belt hook after it has been bent to the position that it will occupy when used in connecting the ends of belting together.
Figure 3:
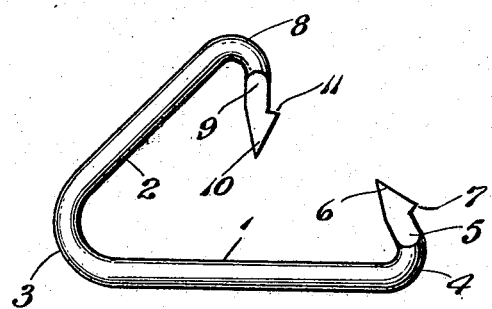
Fig. 3 is an enlarged view of a belt hook previous to its connection to the belt.
Figure 4:
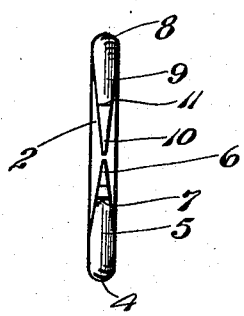
Fig. 4 is a view taken from the right of Fig. 3.

The belt hooks are preferably formed of wire and each includes in its construction long and short arms 1 and 2, respectively, connected by an integral curved portion indicated at 3. The long arm is bent at 4 and terminates in a prong 5 having a flat and pointed end 6, this prong as shown being located in the same plane with arms 1 and 2 and at an acute angle to the arm. Adjacent the end of the prong 5 it is widened and formed on its side opposite the portion 3 with an abrupt shoulder 7 lying at substantially right angles to the length of said prong.

The arm 2 similarly is bent at 8 and terminates in a prong 9 having a flat and pointed end 10 which likewise has a shoulder 11 on its outer side, prongs 5 and 9 being practically identical in formation in all respects, the prong 9 also being bent at an acute angle to the arm 2.

Hooks of this construction may be secured to the ends of a belt as shown at 12 and 13, the curved portions 3 of the hooks passing around a hinge pin 14. When the hooks are attached to a belt end prongs 5 and 9 are inserted into the belt from the opposite sides as the arms 1 and 2 are bent toward each other into substantially parallel relation, the prongs 5 and 9, positioning themselves at an acute angle to the planes of the sides of the belt ends as illustrated in Fig. 1. In the use of a belt the strains to which it is subjected have a tendency to bend the hooks so as to increase the angle between the prongs and the arms 1 and 2 with a consequent rotative movement of the ends of the prongs. With my construction this tendency is firmly resisted by reason of the engagement of shoulders 7 and 11 against the material of the belt and any bending of the hook or withdrawal of the prongs from the belt can occur only with the disruption of the belt material ahead of the shoulders 7 and 11.

From the foregoing it is evident that there is provided a substantially permanent connection of belt hook to a belt by reason of the novel construction of the hook as set forth. Slight changes in minor detail may be resorted to without departing from the invention which is defined in the appended claims and I consider myself entitled to all such modifications as may fall within the scope of the claims.

I claim:—

1. In a belt hook having arms to embrace the end of a belt and prongs at the free ends of the arms adapted to be driven into opposite sides of a belt, shoulders projecting laterally from the prongs near the ends thereof and positioned to be forced into the belt and prevent bending of the prongs on the occurrence of longitudinal strain on the arm.

2. A belt hook comprising connected arms adapted to embrace the end of a belt, prongs projecting inward from the arms adapted to be oppositely inserted in a belt, and shoulders extending from the prongs near the ends and on the outer sides thereof to retain the prongs in the belt.

3. A belt hook comprising a wire bent in U-shape to embrace the end of a belt, the free ends of the same being bent inward at an acute angle to provide attaching prongs each having a shoulder near its end projecting oppositely to the connecting portion of the wire.

4. A belt hook comprising connected spaced apart arms, said arms being adapted to engage opposite sides of a belt and with the connecting portion adapted to extend beyond the end of the belt, a prong at the free end of each arm bent at an acute angle thereto and extending toward the opposite arm, said prongs adapted to be inserted into a belt from opposite sides, and an outwardly projecting shoulder adjacent the end of each prong which on any attempted increase of the angle between a prong and the arm from which it is bent, due to a longitudinal pull on the arm, engages against the belt material and prevents such angular increase and resultant withdrawal of the prong from the belt.

In testimony whereof I affix my signature.

JAMES K. DIAMOND.

Copies of this patent may be obtained for five cents each, by addressing the "Commissioner of Patents, Washington, D. C."